No. 660,023. Patented Oct. 16, 1900.
A. D. NICHOLS.
HOOF PAD.
(Application filed Sept. 22, 1899.)
(No Model.)
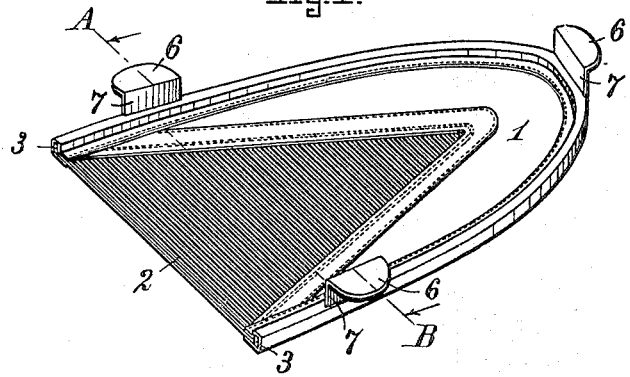
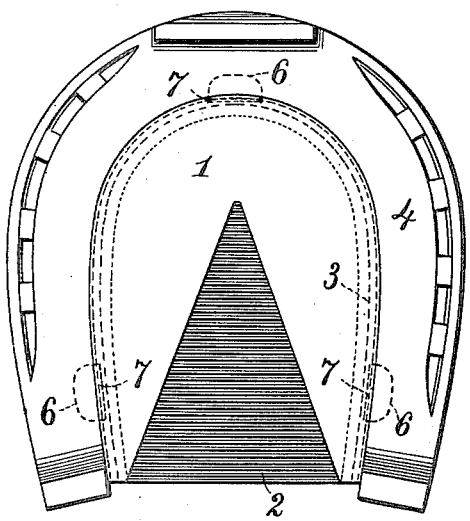
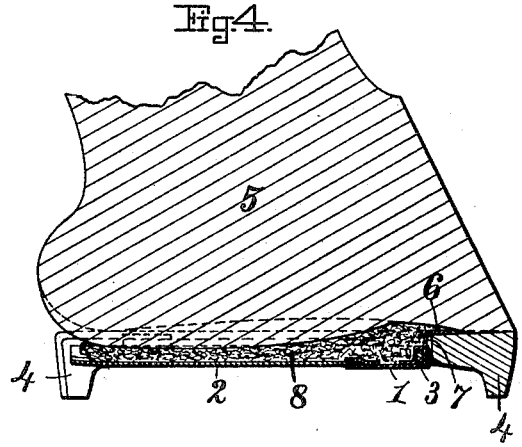
Witnesses
Alice B. Harshman
Harry W. Squires
Inventor
Andrew D. Nichols
by
Henry Chadbourne
his atty.

UNITED STATES PATENT OFFICE.

ANDREW D. NICHOLS, OF EVERETT, MASSACHUSETTS.

HOOF-PAD.

SPECIFICATION forming part of Letters Patent No. 660,023, dated October 16, 1900.

Application filed September 22, 1899. Serial No. 731,337. (No model.)

*To all whom it may concern:*

Be it known that I, ANDREW D. NICHOLS, of Everett, in the county of Middlesex and State of Massachusetts, have invented certain new and useful Improvements in Bandages for Horses' Hoofs, of which the following is a specification.

This invention relates to improvements in bandages for horses' hoofs, and has for its object to retain sponges, poultices, and other articles used in the treatment of the bottom of the hoof without having the bandage carried entirely around the hoof and without the necessity of removing the shoe. It is designed more especially to retain moistened sponges in contact with the bottom of the hoof, one on either side of the frog, in order to moisten and soften the hoof when it has become hard and dry.

With this object in view my invention consists of a piece of cloth or other fabric substantially the shape of the interior of the shoe, but slightly wider than is necessary to cover the space between the sides of the shoe, which piece of cloth is provided with an elastic gusset tending to contract the piece of cloth laterally and is also provided at that part thereof which contacts with the inside of the shoe with a spring tending to expand the piece of cloth laterally, this spring being of greater strength than that of the elastic gusset. This spring in the bandage is provided with retaining-clips to attach the bandage to the hoof, which clips are raised above the level of the bandage in order to form a space between the bottom of the hoof and the bandage when it is in position on the hoof, as will be described hereinafter.

This invention is carried out substantially as illustrated on the accompanying drawings, which form an essential part of this specification, and whereon—

Figure 1 represents a perspective view of my improved bandage. Fig. 2 represents a cross-section on the line A B shown in Fig. 1. Fig. 3 represents a bottom view of a horse's hoof, showing the bandage in position within the shoe on the hoof. Fig. 4 represents a longitudinal section of the hoof, shoe, and bandage, showing a sponge held in place against the bottom of the hoof by means of the bandage.

Like characters of reference refer to like parts wherever they occur on the different parts of the drawings.

Horses when standing in their stalls for a long time are very liable to have their hoofs become dry and hard, which sometimes causes them to be lame and their hoofs to crack. In order to prevent this and to keep their hoofs soft and moist, it is desirable to keep wet sponges or other absorbent materials against the under side of the hoof, and my invention is designed for that purpose and also to allow the sponges used to be as large as possible, so as to retain more moisture and to retain it for an increased period.

My improved bandage consists of the piece of cloth 1 or other flexible material, which is substantially the shape of the interior of the shoe on the hoof on which the bandage is to be used. The cloth 1 is preferably provided with the elastic gore or web 2, substantially as shown, and it is also provided with a spring 3, bound within the edge of the cloth which rests against the inner surface of the shoe. This spring has a tendency to stretch the cloth 1 perfectly flat and also to expand the elastic gusset, as the strength of the spring is in excess of the strength of the gusset; but when the ends of the spring are pressed toward each other the gusset will contract and tend to still keep the cloth flat. It will be seen that the combined action of the gusset 2 and spring 3 is such that the cloth bandage may be made to fit hoofs of different sizes and will automatically remain in a flat position. Clips are attached to the spring 3 in such a manner that they will be forced into spaces between the shoe 4 and the hoof 5 by the action of the spring 3, and substantially as shown in Figs. 3 and 4, in order to hold the bandage in its proper place on the hoof, as hereinafter described. These clips are made with the portion 6, which is in a plane substantially parallel to the surface of the bandage and which is forced within the space between the hoof and the shoe to attach the bandage to the hoof. These clips are also provided with the shank portion 7, by which they are secured to the spring 3 and which extends at substantially a right angle to the surface of the bandage, as shown in Figs. 1, 2, and 4. It will thus be seen that the retaining-clips are made in the form of offsets from the surface of the bandage and that by their use a space or chamber 8 is formed between the surface of the bandage and the bottom of the hoof, which chamber allows wet sponges, a poultice, or other articles used in the doctoring of the hoof to be placed within this pocket or chamber and allows of the use of sponges or poultices of increased size.

As hereinafter set forth, my improved bandage is designed more especially to be used to hold wet sponges in place against the bottom of the hoof to moisten or soften the hoofs when they have become hard and dry from standing in the stall for a long time.

The operation of applying my bandage and the sponges to the hoof in such cases is substantially as follows: A wet sponge is placed against the bottom of the hoof, one sponge on either side of the frog. The ends of the spring 3 in the bandage are then pressed toward each other, allowing the gusset to contract. The front clip on the bandage is then placed in position between the front part of the shoe and the hoof. The rear part of the bandage is then pressed against the bottom of the hoof and the pressure is then removed from the ends of the spring, allowing the clips on the sides of the bandage to enter the spaces between the shoe and hoof, and thereby firmly attach the bandage to the hoof and confine the sponges in their proper position.

My improved bandages are not in sight while a horse is standing and they do not interfere with him while traveling.

One bandage may be used on hoofs of different sizes on account of the elastic gusset contracting or expanding to suit the size of the hoof.

I am aware that it is common to use pads for the protection of hoofs, which are retained in place by clips attached to the pads and placed within recesses on the surface of the shoe which rests against the hoof; but these clips are substantially on a level with the upper surface of the pad and cause the pad to rest against the under surface of the hoof without leaving a space or chamber between the pad and hoof. These pads are made the size and shape of the particular hoof on which they are to be used and do not automatically adjust themselves, so as to be used on different sizes of hoofs.

I do not claim, broadly, clips to retain a protecting-pad or a bandage in place upon the hoof; neither do I claim a pad for the protection of the hoof, as such is common and well known, as above set forth.

Having thus fully described the nature, construction, and operation of my invention, I wish to secure by Letters Patent and claim—

1. In a bandage for horses' hoofs, an expanding spring conforming substantially to the contour of the inner edges of the horse's shoe, a flexible bandage covering said spring, shanks attached to said spring extending at right angles to the surface of said flexible bandage, and clips on said shanks to enter the space between the shoe and hoof extending outward from the contour of said bandage in a plane parallel to the surface of said flexible bandage, thereby forming a chamber between the bandage and the under surface of the hoof, for the purpose set forth.

2. In a bandage for horses' hoofs, a spring to expand said bandage and clips on said spring to retain the bandage in position on the hoof, combined with an elastic gusset in the bandage whereby the bandage is automatically adjusted to fit hoofs of different sizes and will remain flat when in position on the hoof, for the purpose set forth.

In testimony whereof I have affixed my signature in presence of two witnesses.

ANDREW D. NICHOLS.

Witnesses:
HENRY CHADBOURN,
HARRY N. SQUIRES.